(12) United States Patent
Stuckey et al.

(10) Patent No.: US 9,687,927 B2
(45) Date of Patent: Jun. 27, 2017

(54) MODULAR SOLDERING UNIT

(71) Applicant: GE Aviation Systems LLC, Grand Rapids, MI (US)

(72) Inventors: Robert Stuckey, Pompano Beach, FL (US); Michael Carl Ludwig, Margate, FL (US); Mohamed Aly Elsayed, Pompano Beach, FL (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/735,512

(22) Filed: Jun. 10, 2015

(65) Prior Publication Data

US 2016/0361771 A1 Dec. 15, 2016

(51) Int. Cl.
| | |
|---|---|
| *B23K 1/00* | (2006.01) |
| *B23K 3/00* | (2006.01) |
| *B23K 3/02* | (2006.01) |
| *B23K 3/06* | (2006.01) |
| *B23K 3/08* | (2006.01) |

(52) U.S. Cl.
CPC .............. *B23K 3/028* (2013.01); *B23K 3/027* (2013.01); *B23K 3/0615* (2013.01); *B23K 3/08* (2013.01)

(58) Field of Classification Search
CPC ................................ B23K 3/027; B23K 3/028
USPC .................................................... 228/51, 20.5
See application file for complete search history.

(56) References Cited

U.S. PATENT DOCUMENTS

| | | | |
|---|---|---|---|
| 3,990,623 A * | 11/1976 | Fortune ................. | B23K 3/027 219/242 |
| 4,139,138 A | 2/1979 | Besselman, Jr. | |
| 4,456,816 A * | 6/1984 | Fortune ................. | B23K 3/027 219/230 |
| 5,048,742 A * | 9/1991 | Fortune ................... | B23K 3/00 219/227 |
| 5,649,623 A * | 7/1997 | Kornblatt ................ | B25H 3/00 182/129 |

* cited by examiner

*Primary Examiner* — Erin Saad
(74) *Attorney, Agent, or Firm* — GE Global Patent Operation; William S. Munnerlyn

(57) ABSTRACT

A modular soldering station includes a first platform having a liquid reservoir and a solder dispenser, a power supply assembled to the first platform and configured to power a soldering iron, and a second platform assembled to one of the first platform or the power supply and having a fluid absorbent medium fluidly coupled to the liquid reservoir.

6 Claims, 7 Drawing Sheets

MODULAR SOLDERING UNIT

BACKGROUND OF THE INVENTION

A soldering unit is a tool used in soldering. The soldering unit can include a power supply and control module and a hand tool such as a soldering iron. The soldering unit operates by passing an electric current, received and regulated by the power supply and control module, to a resistive heating element in the tip on the soldering iron, generating heat at the tip. The soldering iron, in turn, is utilized to melt solder, a metallic conductor with a low melting point, by applying the heated tip to or near solder such that the solder can flow to electrically couple components being soldered together.

A user operating a soldering unit can also incorporate a number of additional tools for completing the soldering, including, but not limited to, tweezers, knives, solder flux, clips to hold components to be soldered, solder reels, solder wick reels, alternative soldering iron tips, and the like. There is a need to organize a soldering unit and tools to facilitate use and mobility.

BRIEF DESCRIPTION OF THE INVENTION

In one aspect, a modular soldering unit includes a first module having a liquid reservoir and a solder dispenser, a second module having a fluid absorbent medium fluidly coupled to the liquid reservoir, and a pump configured to pump liquid contained in the liquid reservoir onto the fluid absorbent medium.

In another aspect, a soldering station includes a first platform having a liquid reservoir and a solder dispenser, a power supply assembled to the first platform and configured to power a soldering iron, and a second platform assembled to one of the first platform or the power supply and having a fluid absorbent medium fluidly coupled to the liquid reservoir.

In yet another aspect, a mobile kit for a soldering station includes a first platform having a soldering iron holder, a liquid reservoir, and a top surface configured to receive the soldering station, a second platform having a sponge proximate to a fluid port fluidly coupled with the reservoir, and wherein the second platform is configured to be received on a top surface of the soldering station, a pump configured to dispense liquid contained in the liquid reservoir through the fluid port and onto the sponge, a set of holders removably affixed to one of the first or second platforms for holding a set of soldering tools, wherein the set of soldering tools are configured to be rearrangable with respect to the set of holders, the first platform, or the second platform, a set of solder reels and a solder dispenser configured to dispenses solder from the set of solder reels, and a set of solder wick reels and a solder wick dispenser configured to dispense solder from the set of solder reels.

DESCRIPTION OF EMBODIMENTS OF THE INVENTION

The invention can be implemented in any environment using a soldering iron regardless of whether the soldering iron provides a separate power supply unit, or includes the power supply unit as part of the soldering iron, itself For purposes of this description, the hand-held portion of the soldering iron with the heated tip for melting solder will be referred to as a "soldering wand," while the combination of a power supply unit and the soldering wand will be generally referred to as the "soldering iron," unless noted. A brief understanding of soldering activities will be explained for understanding, A soldering iron is configured to operate such that a power supply unit receives a supply of power, and regulates or converts the supply of power to a desired, user-selectable, or user-configurable power output. The power output is supplied to the soldering wand by way of an electrical connection, where a resistive heating element in the tip on the soldering wand generates heat from the power output to melt a meltable element, such as solder. Solder is a fusible metal alloy used to electrically or physically join together metal components, and is configured to have a melting temperature below the metal components. One non-limiting example of solder can include an alloy having a 60% tin and 40% lead composition that has a melting point between 182 degrees Celsius and 191 degrees Celsius. Many alternative solder compositions and melting points are envisioned by the disclosure, and are not germane to embodiments of the invention.

Figure 1:
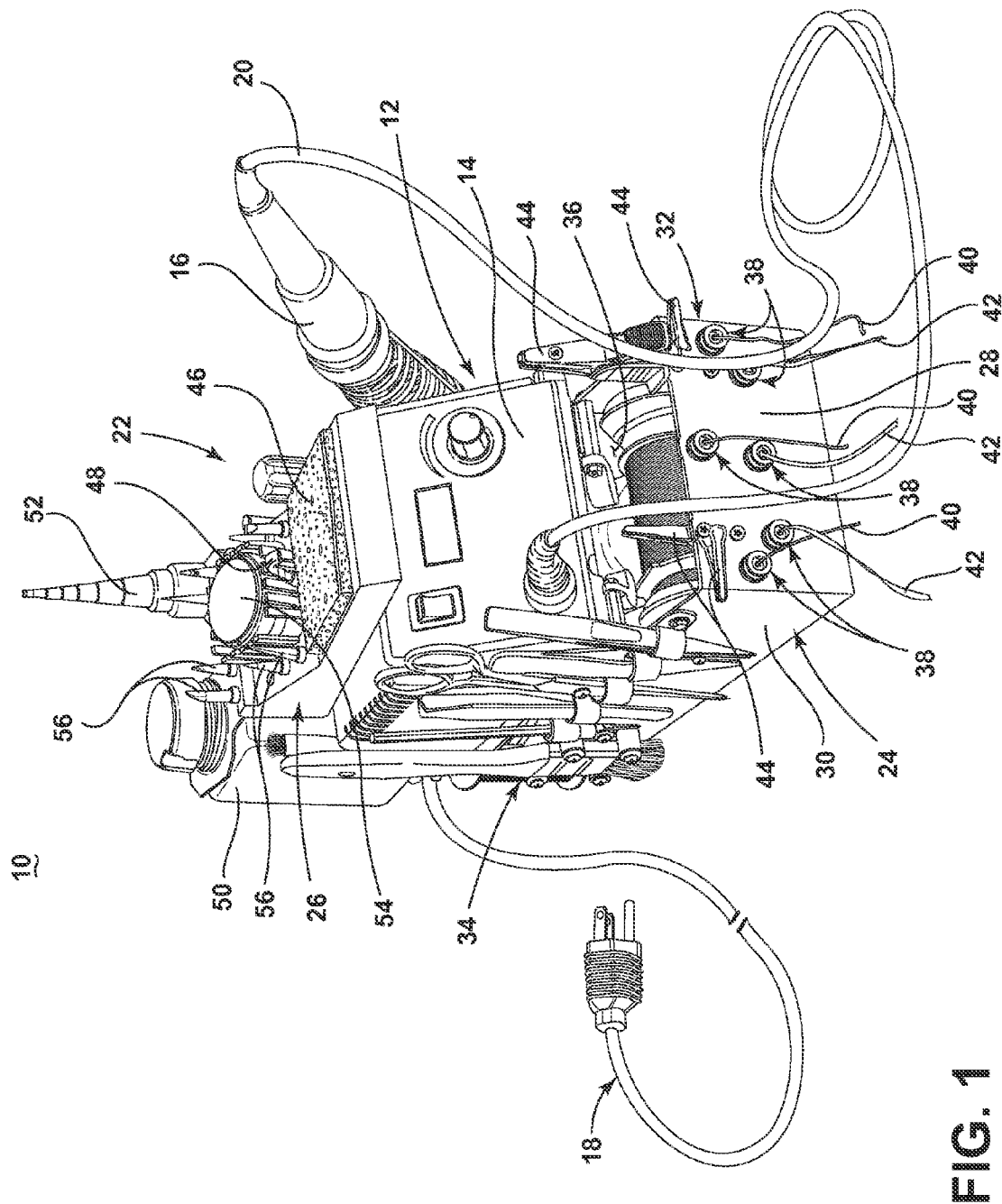
FIG. 1 is a perspective front-facing view illustrating the modular soldering station.

FIG. 1 illustrates a modular soldering station 10, or mobile kit for a soldering station, for a user to utilize while operating a soldering iron 12. As shown, the soldering iron 12 can include a separate power supply unit 14 and soldering wand 16. The power supply unit 14 can further include a plug 18 configured to receive a supply of power from, for example, a wall outlet, and a cord 20 electrically coupling the power supply unit 14 to the soldering wand 16. The soldering iron 12 is configured to operate such that the power supply unit 14 receives a supply of power from the plug 18, and regulates or converts the supply of power to a desired, user-selectable, or user-configurable power output. The power output is supplied to the soldering wand 16 by way of the cord 20, to a resistive heating element in the tip on the soldering wand 16, generating heat in the wand 16 to melt a meltable element, such as solder.

While a soldering iron 12 having a separate power supply unit 14 is shown, embodiments of the disclosure can be configured to operate with soldering irons 12 without separate power supply units 14.

The modular soldering station 10 can further include a modular soldering unit 22, or modular solder accessory unit, shown having a first module 24 or platform and a second module 26 or platform. As described herein, a module or platform can define any geometric structure having the limitations described herein. For example, while the first module 24 is shown having a rectangular box-like configuration, alternative module or platform configurations can be envisioned, including but not limited to, two-dimensional or three-dimensional ovals, squares, circular, pyramids, or any number of faceted enclosures.

In one embodiment of the disclosure, the first module 24 can define a front-facing wall 28, opposing first and second sidewalls 30, 32, and a back wall 34, collectively enclosing an interior space 36 of the first module 24. The first module 24 can also optionally include a top wall and a bottom wall, which are not illustrated for ease of understanding. As used herein, the "front-facing," "side," and "back" walls 28, 30, 32, 34 can be defined with reference to the location of a user during operation of the soldering iron 12. However, it is understood that the walls 28, 30, 32, 34 can be interchangeably defined based on the position, rotation, and placement of various components of the modular soldering station 10, itself. For example, while the front-facing wall 28 is illustrated as the vertical wall closest to the viewer of the perspective view of FIG. 1, a top-down 90 degree clockwise rotation of the modular soldering station 10, for instance, can result in the previously front-facing wall 28 effectively aligned as a sidewall 30, 32. Thus, it will be understood references to "front-facing," "side," "back," "top," and "bottom" walls 28, 30, 32, 34 are only with reference to the figures shown, and can be interchangeable in practice.

The front-facing wall 28 is shown having a set of ports 38 providing corresponding apertures through the wall 28 into the interior space 36 of the first module 24. The set of ports 38 provide a user access to usable or consumable materials while operating the soldering iron 12. Examples of usable or consumable material can include, but are not limited to, solder for fusing components or solder wick for removing solder. As shown, a subset of the ports 38 can be configured to dispense lines or wires of solder 40 to the user, while another subset of the ports 38 can be configured to dispense lines of solder wick 42. In one example configuration, different wires of solder 40 or lines or solder wick 42 can be dispensed by the respective subsets of ports 38. For instance, varying thicknesses of solder 40 or solder wicks 42 can be dispensed through the corresponding subsets of ports 38.

The front-facing wall 28 can further include at least one alligator clip 44 configured to hold or clasp a component for soldering activities. For example, a user can utilize an alligator clip 44 to hold a first component such as a printed circuit board (PCB) while the user utilizes a first hand to dispense solder 40 toward the PCB and a second hand to operate the soldering wand 16 for melting the solder on the PCB. Alternatively, the user can utilize more than one alligator clip 44 for holding a set of components, solder 40, or solder wicks 42 proximate to one another to perform soldering activities. In this sense, the alligator clips 44 of the first module 24 can be selectively or permanently affixed to the front-facing wall 28, or can be slidably, rotatably, or extendably affixed to any wall 28, 30, 32, 34 that the user can utilize. Examples of selective affixing can include magnetic coupling, mechanical fasteners, snaps, straps, or friction mounts such as a double-headed alligator clip 44, wherein one of the alligator clips 44 is used for mounting to the first module 24. Additional selective affixing mechanisms or configurations are envisioned by embodiments of the disclosure.

The second module 26 can also include soldering activity tools, and is shown having a fluid absorbent medium 46, such as a sponge. The fluid absorbent medium 46 is configured such that it is proximate to, or fluidly coupled with a liquid dispenser 48, shown as a faucet or spout. In this sense, the liquid dispenser 48 is configured to dispense liquid onto the fluid absorbent medium, for instance, such that a wet sponge can be used for cleaning the tip of the soldering wand 16.

The second module 26 further includes a coupling or holder for removably affixing one or more bottles having liquid used for soldering activities. As shown, the second module 26 can include a removably affixing configuration such as a hook, clasp, or holder for the one or more bottles, illustrated as an alcohol bottle 50 and a solder flux bottle 52. Embodiments of the disclosure can include interchangeable affixing components such that the one or more bottles can be interchangeable based on the preference of the user, or that the interchangeable affixing components enable reconfiguration of the one or more bottles in an alternative location of the first or second modules 24, 26. Alternatively, more or fewer bottles can be included in embodiments of the disclosure.

The second module 26 is also illustrated including a tip tinner container 54 utilized for cleaning baked on residue and preventing oxidation of the tip of the soldering wand 16. The second module 26 can further include a set of replacement tips 56 for the soldering wand 16 that can, for instance, replace damaged or defective wand tips, or to provide for specialty wand tips for particular soldering activities or applications. The set of tips 56 and the second module 26 can be configured such that the set of tips 56 are interchangeable in the module, so that the set of tips 56 can be arranged based on the preferences of the user.

As shown, the modular soldering station 10 is configured such that the first module 24 is arranged or assembled below the power supply unit 14 of the soldering iron 12, and the second module 26 is arranged or assembled above the power supply unit 14. Alternative configurations of the modular soldering station 10 can be envisioned by embodiments of the disclosure that include, for example, a soldering iron 12 that does not have a separate power supply unit, wherein the first module 24 is arranged or assembled directly with the second module 26. The embodiments of the disclosure can further include mechanisms or components for the assembling of the first module 24, power supply unit 14, and second module 26, or alternatively the first module 24 and second module 26. For example, mechanical fasteners, snaps, straps, or the like can be utilized for removably affixing or selectively mounting the aforementioned components to one another, such that a user can assembly and disassemble the modular soldering station 10 as needed. Additional affixing mechanisms or components can be included in embodiments of the disclosure.

Figure 2:
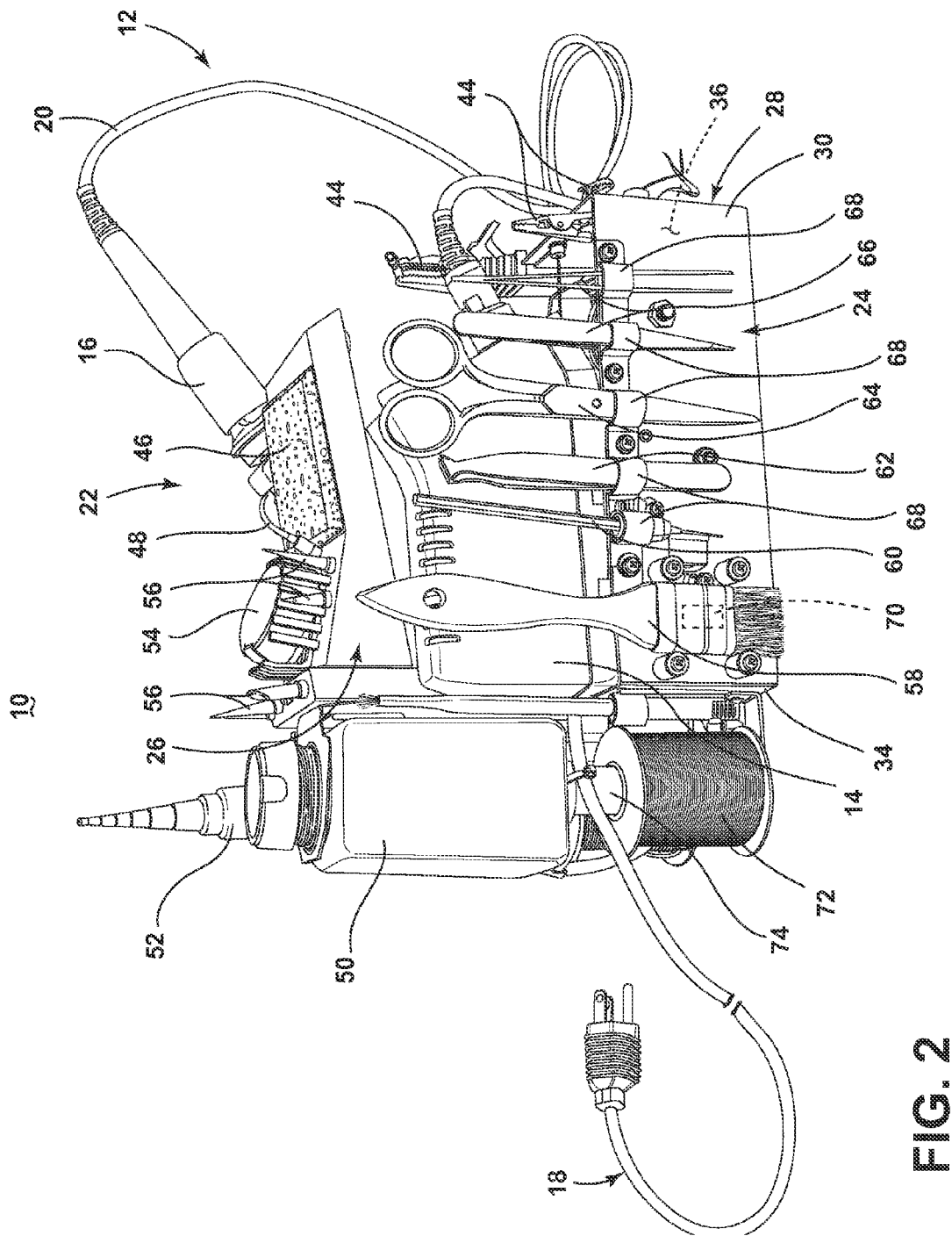
FIG. 2 is a perspective left-facing view illustrating the modular soldering station.

Turning now to FIG. 2, the modular soldering station 10 is illustrated showing a set of soldering tools removably affixed or selectively mounted with the first sidewall 30 of the first module 24. As shown, the set of soldering tools can include at least one of a brush 58, a pick 60, a wire stripper 62, a pair of scissors 64, or a pair of tweezers 66, shown as two different pairs of tweezers 66. The set of soldering tools can be removably affixed or selectively mounted with the first sidewall 30 by way of a set of holders 68 coupled with the first sidewall 30. While the set of holders 68 are illustrated coupled with the first sidewall 30 by way of a mechanical screw, alternative fasteners, including removable fasteners are envisioned.

For example, individual holders 68 can be configured to match respective soldering tools, wherein the holders are removably attached with the first sidewall 30. In this configuration, a user can rearrange or reconfigure the placement of the various set of soldering tools, by rearranging or reconfiguring the respective holders 68 for the tools, in accordance with their tool preferences. In yet another configuration, the set of holders 68, or a subset of holders 68 can be configured to include affixing methods or mechanisms besides physical mounting devices. For example, the brush 58 can be configured to include a magnet (shown in dotted outline 70) configured to magnetically couple the brush with the first sidewall 30 of the first module 24. In this configuration, the first sidewall 30 can be configured to include a magnetic material such that the brush can be magnetically affixed to all locations of the sidewall 30, or can be configured to include only magnetic portion, such as a corresponding magnet affixed within the sidewall 30, or within the interior space 36 of the first module. Additional holders 68, 70 or holding mechanisms are envisioned, including but not limited to, soldering tool seats, friction mounts, fasteners, snaps, or straps.

Moreover, while the first sidewall 30 is illustrated including the soldering tools and corresponding set of holders 68, 70, embodiments of the disclosure are envisioned wherein any of the set of walls on the first module 24 (e.g. the front-facing wall 28, second sidewall 32, or back wall 34), the second module 26, or power supply unit 14 can be configured to removably or fixedly receive the set of holders 68, 70 such that a user can rearrange or reconfigure the tools on any or all surfaces of the modular soldering station 10.

FIG. 2 also illustrates the back wall 34 having at least one solder reel 72 or solder spool mounted with a corresponding reel stand 74. A solder reel 72 is a unit of solder 40 that dispenses solder 40 as one continuous line or wire of solder 40. Embodiments of the disclosure include configurations wherein the solder reel 72 can rotate about the reel stand 74 to unravel the solder 40, which can be fed through the interior space 36 of the first module 24 to supply the subset of ports 38 on the front-facing wall 28 dispensing the solder 40. The back wall 34 can be configured with a set of reel stands 74 configured to support a corresponding set of solder reels 72 for supplying the solder 40 of the subset of ports 38 on the front-facing wall 28. Alternatively embodiments of the disclosure can include configurations wherein, instead of solder reels 72, or in addition to solder reels 72, reels of solder wick 42 can be mounted for supplying solder wick 42 to the subset of ports 38 on the front-facing wall 28.

Figure 3:
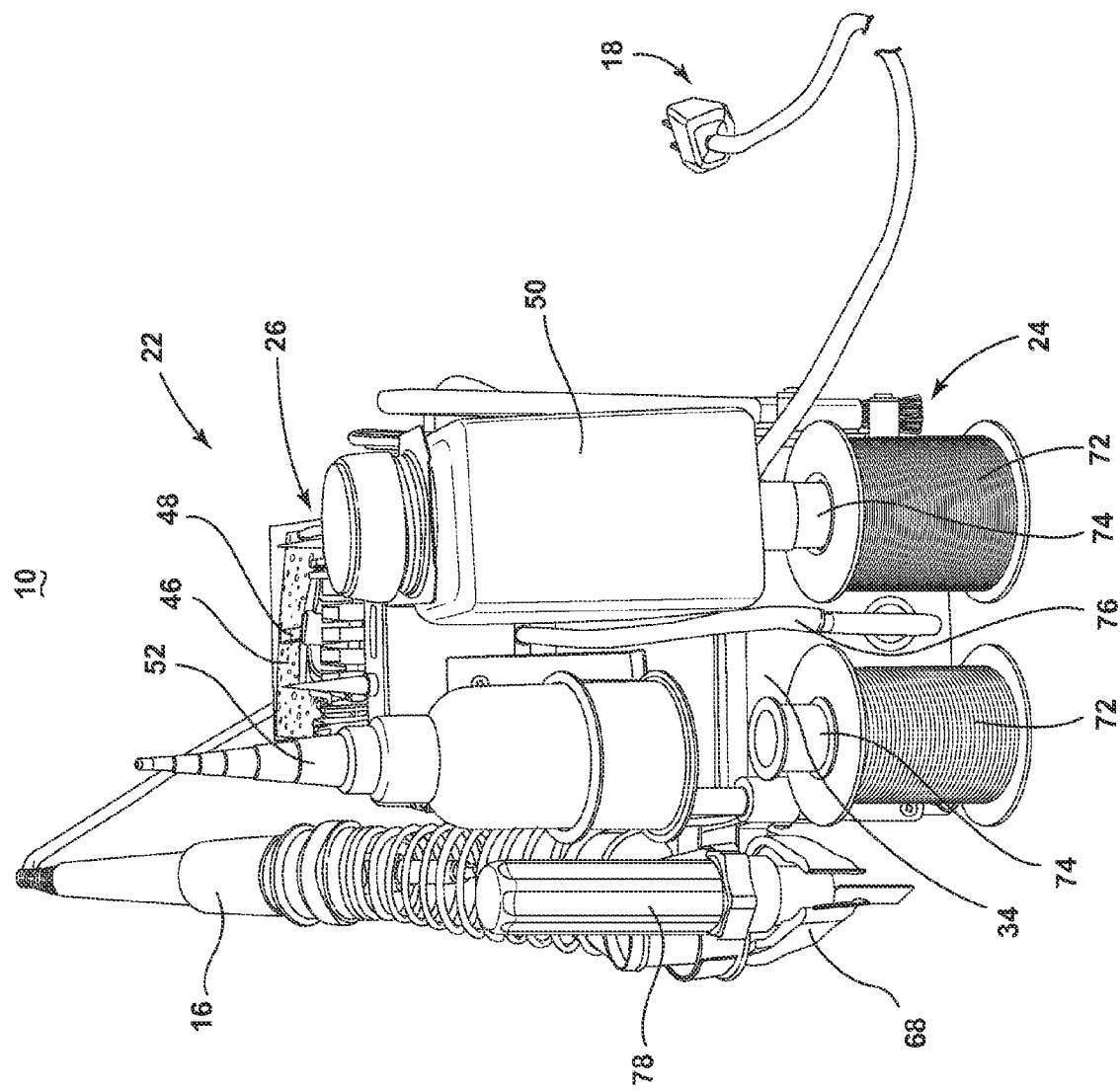
FIG. 3 is a perspective rear-facing view illustrating the modular soldering station.

FIG. 3 illustrates a perspective view of the modular soldering station 10 facing the back wall 34 of the first module 24. As shown, a fluid coupling 76 fluidly connects the first module 24 with the second module 26. More specifically, the fluid coupling 76 can connect the interior space 36 of the first module 24 with the liquid dispenser 48 of the second module 26. The fluid coupling 76 can provide an operable pathway or channel such that a fluid stored in the first module 24, such as water, can be delivered, pumped, supplied or provided to the liquid dispenser 48, and dispensed onto the fluid absorbent medium 46. FIG. 3 further illustrates a solder scraping knife 78 that can be selectively or permanently affixed with the first module 24 by way of a holder 68. As described above, embodiments of the disclosure are envisioned wherein the knife 78 and holder 68 can be removably interchanged or rearranged with the other set of holders 68 and soldering tools, based on user preferences.

Figure 4:
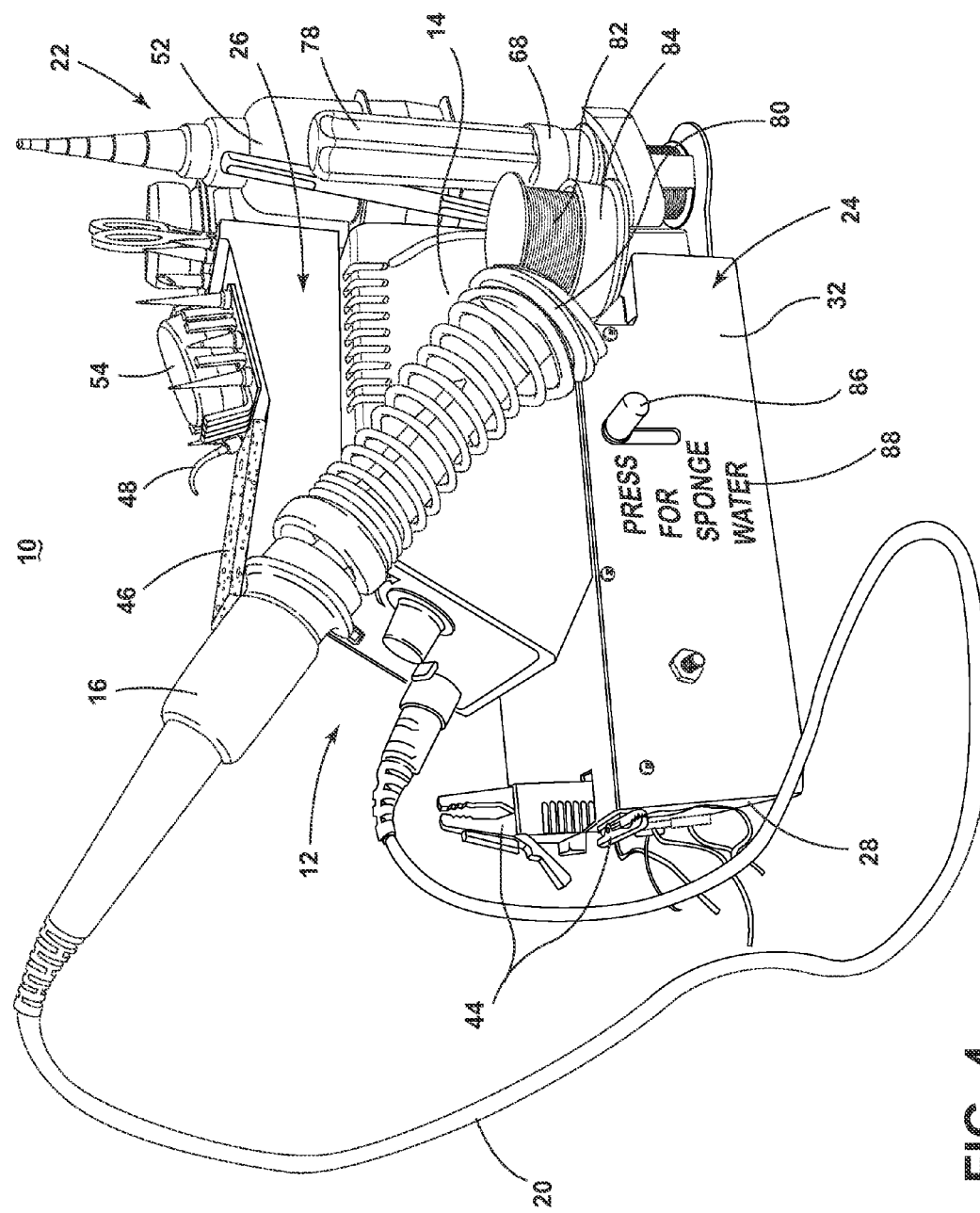
FIG. 4 is a perspective right-facing view illustrating the modular soldering station.

FIG. 4 illustrates a perspective view of the modular soldering station 10 facing the second sidewall 32 of the first module 24. As shown, the second sidewall 32 can support a soldering wand holder 80, wherein a user can rest the soldering wand 16 when not in use, as well as additional soldering tools, illustrated as an eye loupe 82 and respective eye loupe holder 84. While the soldering wand holder 80 and eye loupe holder 84 are shown in close proximity, embodiments of the disclosure can include configurations wherein the holders 80, 84 are combined into a single holder, or distinct and separate holders 80, 84 that are independently configurable, affixable, or selectively removable.

Moreover, each of the holders 80, 84 can include the same configurations that allow for removable interchanging and rearranging with the other set of holders 68 described here. For example, particular users, such as left-handed users, can prefer for the soldering wand 16 to be configured on the first sidewall 30 of the first module 24, such that it can be utilized by the user's dominant hand. In such an example, the second sidewall 32 can be configured such that the set of holders 68 and assortment of soldering tools can be rearranged or configured to removably couple with the second sidewall 32, and the soldering wand holder 80 can be rearranged or configured to couple with the first sidewall 30. As explained herein, the modular soldering station 10 can be configured or selectively rearranged to provide for a user-configured set of soldering tools with a corresponding set of tool holders 68, 84, as well as a soldering wand holder 80 configured to accommodate a left-handed or right-handed user.

FIG. 4 further illustrates a user-controllable lever 86 that extends through the second sidewall 32 into the interior space 36 of the first module 26. The lever 86 can be configured to operate the dispensing of a fluid from the interior space 36 of the first module 24 onto the fluid absorbent medium 46, by way of the fluid coupling 76 or the liquid dispenser 48. The operation of the lever 86 will be explained below, with reference to FIG. 6. As shown, the second sidewall 32 can optionally include indicia 88 describing or explaining the operation of the lever 86 to a user. While the indicia 88 is shown stating "PRESS FOR SPONGE WATER", alternative indicia 88, directions, explanations, and the like are envisioned.

Figure 5:
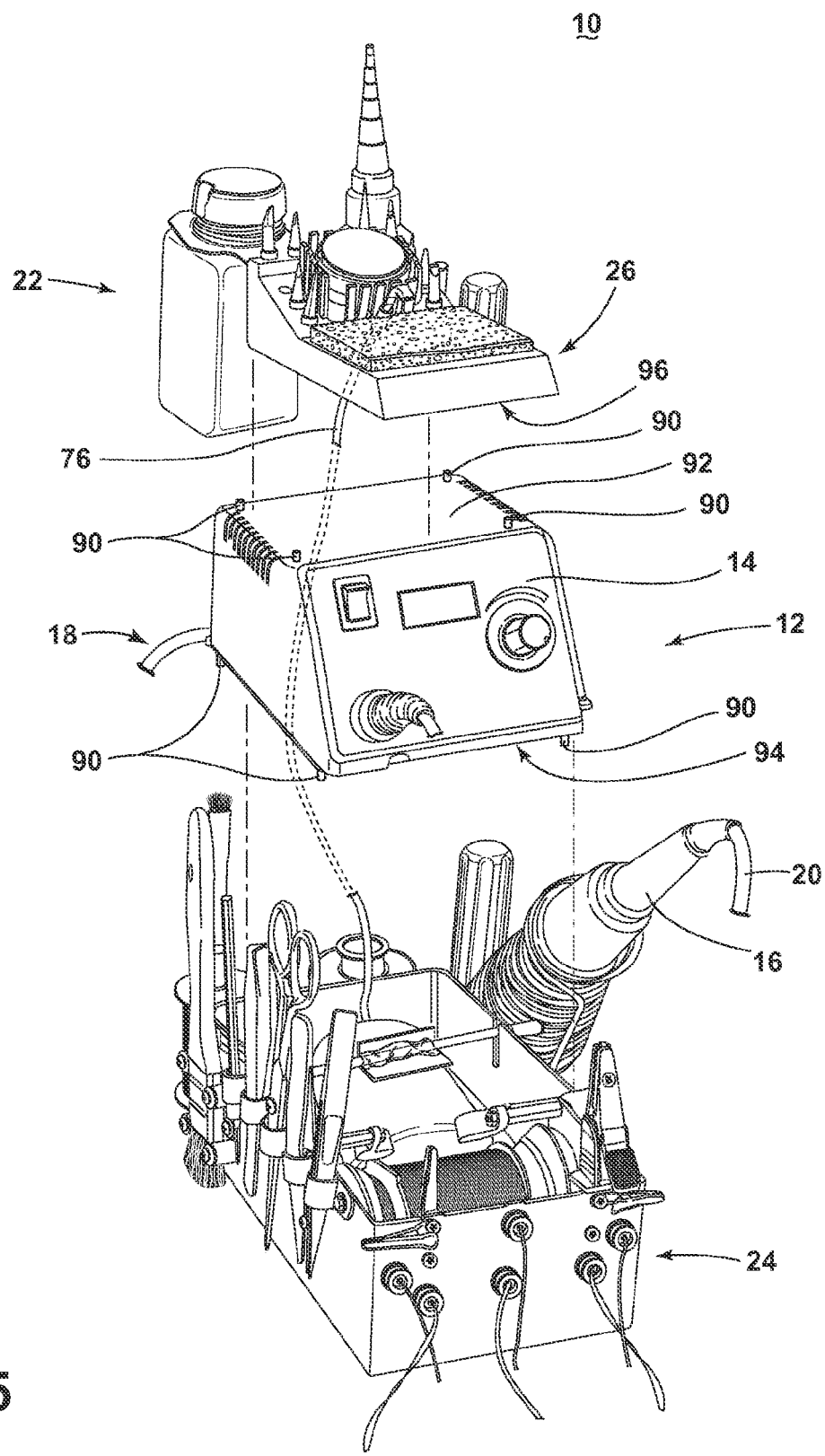
FIG. 5 is a perspective front-facing exploded view illustrating the modular soldering station.

FIG. 5 illustrates an exploded perspective view of the modular soldering station 10 for an understanding of how the first module 24 or second module 26 are configured to mount with the power supply unit 14 of the soldering iron 12. At least one of the first module 24, second module 26, or power supply unit 14 can include permanently or selectively affixed mounts 90 configured to permanently or selectively mount at least one of the first module 24 or second module 26 with the power supply unit 14. As shown, the mounts 90 can be located on a top surface 92 of the power supply unit 14 or a bottom surface 94 of the power supply unit 14.

The mounts 90 are envisioned to correspond, where appropriate based on the particular mount 90 configuration selected, with a mount-receiving coupling on, for example, a bottom surface 96 of the second module 26 or a top surface (not shown) of the first module 24. The mounts 90 can include any mounting or mechanical mechanisms suitable for coupling at least one of the first module 24 or second module 26 with the power supply unit 14 during movement of the modular soldering station 10, such as carrying the station from a first location to a second location. Example mounts 90 can include screws, clips, straps, adhesives, fusing, and the like. Alternative configurations of the modular soldering station 10 or modular soldering unit 22 are envisioned wherein the first module 24 and second module 26 include mounts 90 configured such that the first and second modules 24, 26 mount directly to one another, without a power supply unit 14.

Figure 6:
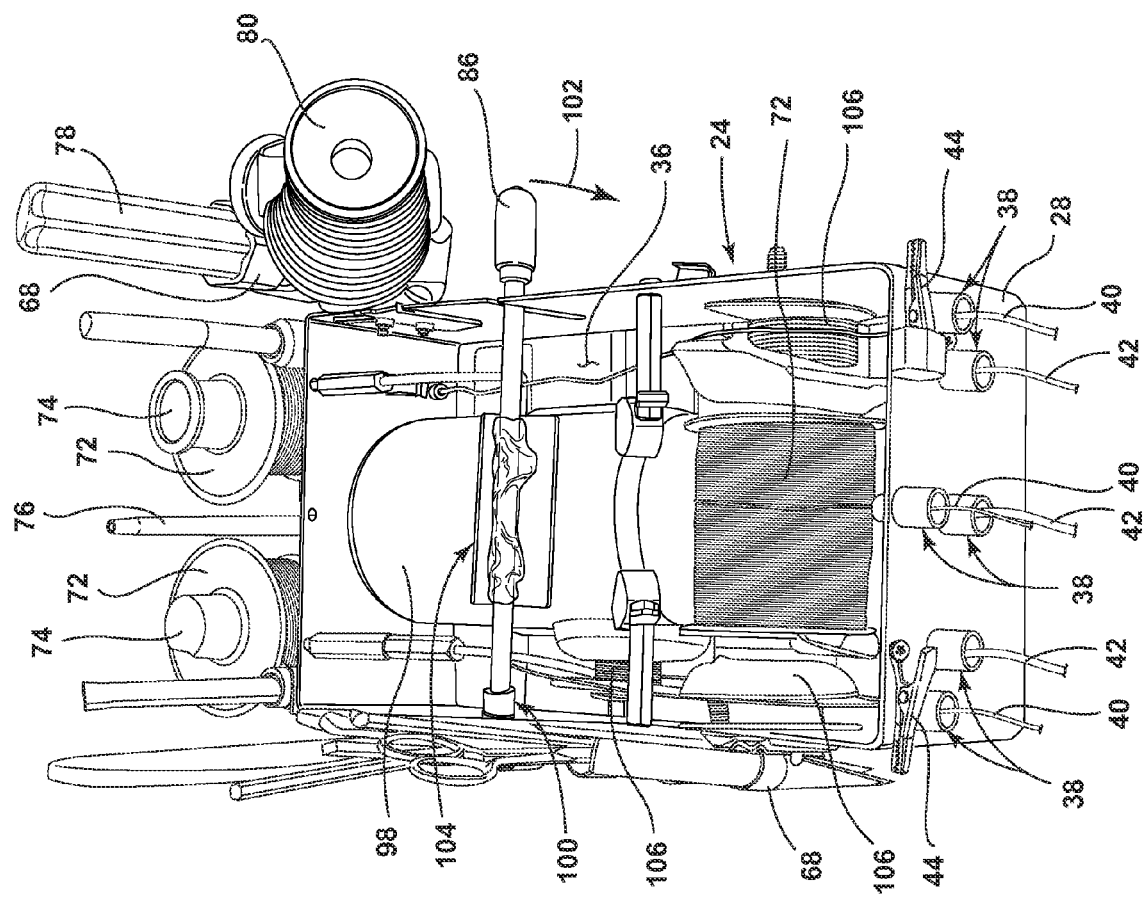
FIG. 6 is a perspective top-down view illustrating the interior of the first module.

FIG. 6 is a perspective top-down view illustrating the interior of the first module 24. The lever 86 is illustrated having a first end 100 fixed at the inner surface of the first sidewall 30. The first module 24 can include a liquid reservoir 98, such as a bottle, positioned below the lever 86, which is fluidly coupled with the fluid coupling 76. The lever 86 and the liquid reservoir 98 are configured in a pressure-sensitive relationship, such that the downward movement of the lever (shown as arrow 102), pivoting by way of the fixed first end 100, produces pressure in the liquid reservoir 98. The pressure produced by the movement 102, in turn, pumps, forces, or delivers liquid contained in the liquid reservoir 98, including but not limited to water, through the fluid coupling 76, and ultimately, onto the fluid absorbent medium 46 via the liquid dispenser 48. While water is one non-limiting example of a fluid contained within the liquid reservoir 98, any liquid suitable for soldering activities can be included, such as flux or alcohol. In another example, a liquid medicine can be included in the liquid reservoir 98, such that a user can apply the liquid medicine in the event of a soldering iron 12 skin burn. As shown, the level 86 can optionally include a buffer device 104 aligned with the liquid reservoir 98 to aid or ensure the pressure-sensitive relationship desired by a user. For example, a larger buffer device 104 can enable more liquid dispensed per pump, while a smaller or no buffer device 104 can enable less or a more precise amount of liquid dispensed per pump.

The interior of the first module 24 can also include a number of additional reels or spools for distributing solder, solder wick, or additional soldering supplies. For example, a number of respective solder reels 72 or solder wick reels 106 can be supported by further reel stands (not shown), such that the reels 72, 106 are configured to dispense, supply, or provide the respective solder 40 or solder wick 42 to the corresponding set of ports 38 on the front-facing wall 28 of the first module 24. The illustrated configuration can be optionally configured to provide for pass through of the solder 40 or solder wick 42 of the respective reels 72 supported by the outer surface of the back wall 34 as well.

Figure 7:
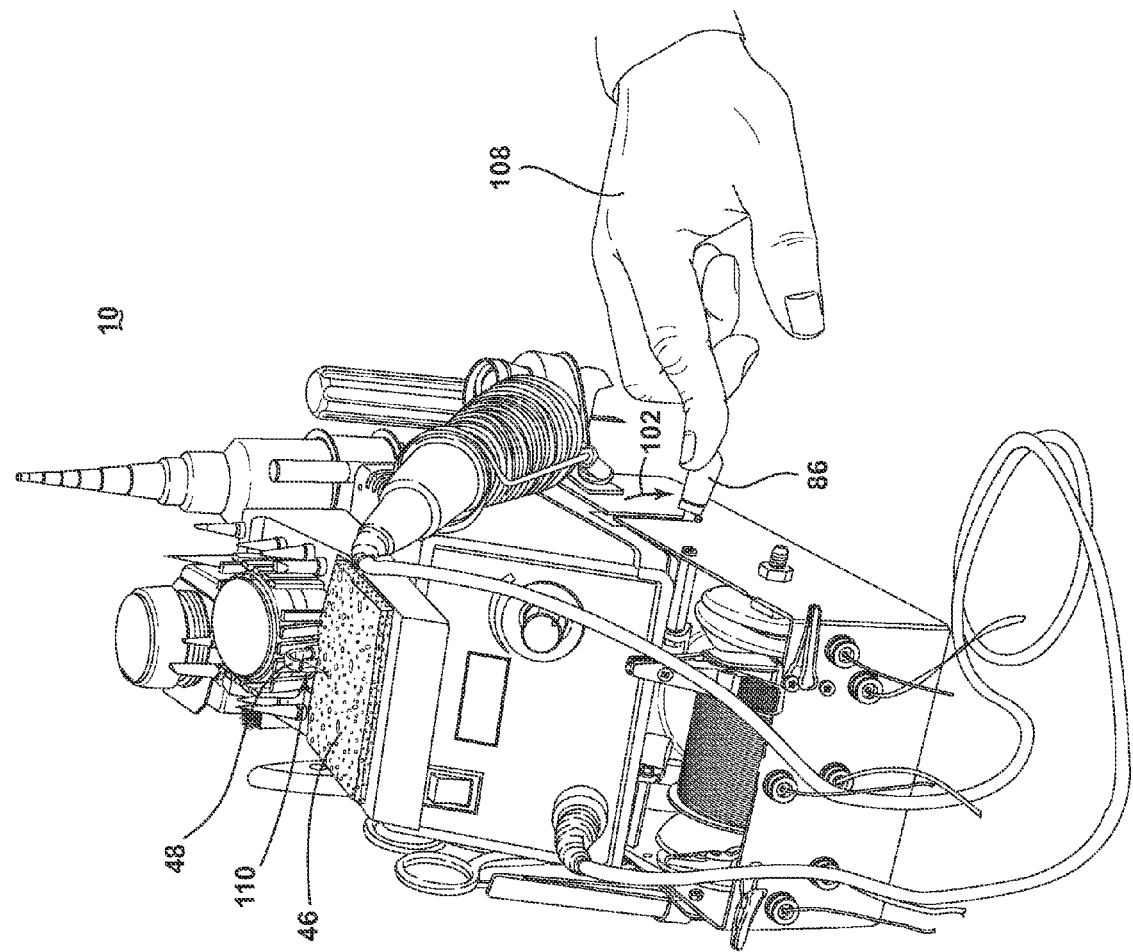
FIG. 7 is a perspective front-facing view illustrating the user-activated dispensing of fluid onto the fluid absorbent medium.

FIG. 7 illustrates a perspective front-facing view illustrating the user-activated dispensing of fluid onto the fluid absorbent medium 46. As shown, a user 108 activates the movement 102 of the lever 86, which in turn pumps liquid, such as water 110, from the liquid reservoir 98. The water 110 is pumped through the fluid coupling 76, and is dispensed by the liquid dispenser 48 onto the fluid absorbent medium 46.

Many other possible embodiments and configurations in addition to that shown in the above figures are contemplated by the present disclosure. For example, one embodiment of the disclosure contemplates an interchangeable mounting system for the set of holders 68, 80, 84 such that any soldering tool can be modularly rearranged on the first module 24, second module 26, or power supply unit 14. In this configuration, a user is able to reconfigure the soldering tools in accordance with user preferences. Additionally, the design and placement of the various components can be rearranged such that a number of different in-line configurations could be realized.

The embodiments disclosed herein provide a modular soldering station. One advantage that can be realized in the above embodiments is that the above described embodiments are configured to include a number of soldering activity accessories and components easily within reach of a user operating the soldering iron. The soldering accessory and components are further configured with modular, interchangeable, or reconfigurable aspects such that a user is free to arrange the accessories and components to suit their preferences or needs. One example of preferences or needs includes configuring the modular soldering station for right-handed or left-handed soldering wand use.

Another advantage of the above embodiments is that the modular soldering station enables a compact, self-contained unit having all necessary soldering iron and soldering accessories configured for portability. The portability enables a user to carry all necessary soldering components from one workstation to another workstation without having to make multiple trips or risk of losing parts. Yet another advantage of the above embodiments allows for increased safety in operating the soldering iron or soldering iron accessories. For example, a user can configure sharp accessories (e.g. a pick or knife) away from other accessories to reduce the risk of accidental injury from the sharp accessory. Likewise, a left-handed user can reconfigure the soldering wand holder for left-handed use, reducing the need to cross a hot soldering wand over the soldering station, which can result in accidental skin burns.

Yet another advantage of the above embodiments allows for an easily accessible sponge and sponge-wetting configuration such that the soldering tip can be accurately and easily cleaned during soldering activities, while keeping the liquid reservoir incorporated within the station, and not as a separate unit.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A mobile kit for a soldering station, comprising:
a first platform having a soldering iron holder, a liquid reservoir, and a top surface configured to receive at least one other platform;
a second platform having a sponge proximate to a fluid port fluidly coupled with the reservoir, and wherein the second platform is configured to be received on the top surface of the first platform;
a pump configured to dispense liquid contained in the liquid reservoir through the fluid port and onto the sponge;
a set of soldering tool holders removably affixed to one of the first or second platforms for holding a set of soldering tools, wherein the set of soldering tools are configured to be rearrangable with respect to the set of holders, the first platform, or the second platform and the set of soldering tool holders are configured to hold at least one of a brush, a pick, a wire stripper, a scissors, or a tweezers;

a set of solder reels and a solder dispenser configured to dispenses solder from the set of solder reels; and a set of solder wick reels and a solder wick dispenser configured to dispense solder wick from the set of solder wick reels.

2. The mobile kit of claim 1 wherein the soldering iron holder is configured to be selectively mounted on either of opposing walls of the first platform.

3. The mobile kit of claim 1 wherein the pump is a lever located proximate to the liquid reservoir and having a first end pivotally affixed to a sidewall of the first platform, and configured such that pivoting the lever, by way of the affixed first end, produces pressure in the liquid reservoir.

4. The mobile kit of claim 1 wherein the liquid reservoir further includes a liquid comprising solder flux, alcohol, or medicine.

5. The mobile kit of claim 1 wherein the first and second platforms further include respective mounts configured to mount to the soldering station.

6. The mobile kit of claim 5 wherein the respective mounts are configured to removably mount at least one of the first or second platforms to the soldering station.

* * * * *